(12) United States Patent
Chang (10) Patent No.: US 7,419,135 B2
(45) Date of Patent: Sep. 2, 2008

(54) QUICK CONNECTOR

(76) Inventor: Yu-Ching Chang, No. 20, Alley 32, Lane 90, Xi-shi Rd., Feng Yuan City, Taichung Hsien (TW)

( * ) Notice: Subject to any disclaimer, the term of this patent is extended or adjusted under 35 U.S.C. 154(b) by 92 days.

(21) Appl. No.: 11/641,063

(22) Filed: Dec. 19, 2006

(65) Prior Publication Data

US 2008/0116407 A1    May 22, 2008

(30) Foreign Application Priority Data

Nov. 20, 2006    (TW) ................... 95142860 A (51) Int. Cl.
*F16K 51/00* (2006.01)
*F16L 29/00* (2006.01)
*F16L 37/28* (2006.01)

(52) U.S. Cl. ................. 251/149.6; 251/149.1

(58) Field of Classification Search ............. 251/149.1, 251/149.4, 149.6
See application file for complete search history.

(56) References Cited

U.S. PATENT DOCUMENTS

| | | | | |
|---|---|---|---|---|
| 2,730,382 A | * | 1/1956 | De Mastri ............... 285/277 |
| 2,744,770 A | * | 5/1956 | Davidson et al. .......... 285/316 |
| 2,905,485 A | * | 9/1959 | Zajac ................... 251/149.6 |
| 3,177,018 A | * | 4/1965 | Goodwin ................. 285/277 |
| 3,873,062 A | * | 3/1975 | Johnson et al. .......... 251/149.6 |
| 5,967,491 A | * | 10/1999 | Magnuson et al. ........ 251/149.6 |

* cited by examiner

*Primary Examiner*—John K. Fristoe, Jr.
(74) *Attorney, Agent, or Firm*—Browdy and Neimark (57) ABSTRACT

A quick connector includes a main member, a housing, a sliding member and an elastic member. The main member has a chamber therein, two bores, a check valve and an elastic device urging the check valve sealing the bore. The housing has a big end, a small end and a sloping section. The big end is connected to the bore of the main member. The sliding member has an elongated bore, first and second ring portions, a plurality of apertures, and balls received in the apertures. The sliding member is inserted into the housing via the small end with the first ring portion out of the housing, the second ring portion in the housing and the sloping section of the housing between the first ring portion and the second ring portion. The elastic member urges the sliding member distal to the main member initially.

6 Claims, 9 Drawing Sheets

QUICK CONNECTOR

BACKGROUND OF THE INVENTION

1. Field of the Invention

The present invention relates to a power tool and more particularly, to a quick connector with properties of simple structure and easy operation.

2. Description of the Related Art

A conventional quick connector of a high-pressure hose includes an outer tube, a spring and a ball. To assemble a tube, user has to draw the outer tube backwards to leave a positioning portion for insertion of the tube. Next, the spring will return the outer tube when the outer tube is released.

To disassemble the tube, user has to draw the outer tube backwards again for removal of the tube, and then the outer tube is released. The conventional quick connector has no fatal problem, however, the way of assembling and disassembling the tube may have someway of improvement.

SUMMARY OF THE INVENTION

The primary object of the present invention is to provide a quick connector, which is simple in structure, easier in operation and lower in cost.

To achieve the object of the present invention, the quick connector includes a main member, a housing, a sliding member and an elastic member. The main member has a chamber therein, two bores communicated with the chamber, a check valve and an elastic device urging the check valve sealing the bore. The housing has a big end, a small end and a sloping section. The big end of the housing is connected to the bore of the main member to be communicated with the chamber of the main member. The sliding member has an elongated bore through the sliding member, a first ring portion and a second ring portion, a plurality of apertures between the first ring portion and the second ring portion, and balls received in the apertures. The sliding member is inserted into the housing via the small end with the first ring portion out of the housing, the second ring portion in the housing and the sloping section of the housing between the first ring portion and the second ring portion. The elastic member urges the sliding member distal to the main member initially.

DETAILED DESCRIPTION OF THE INVENTION

Figure 1:
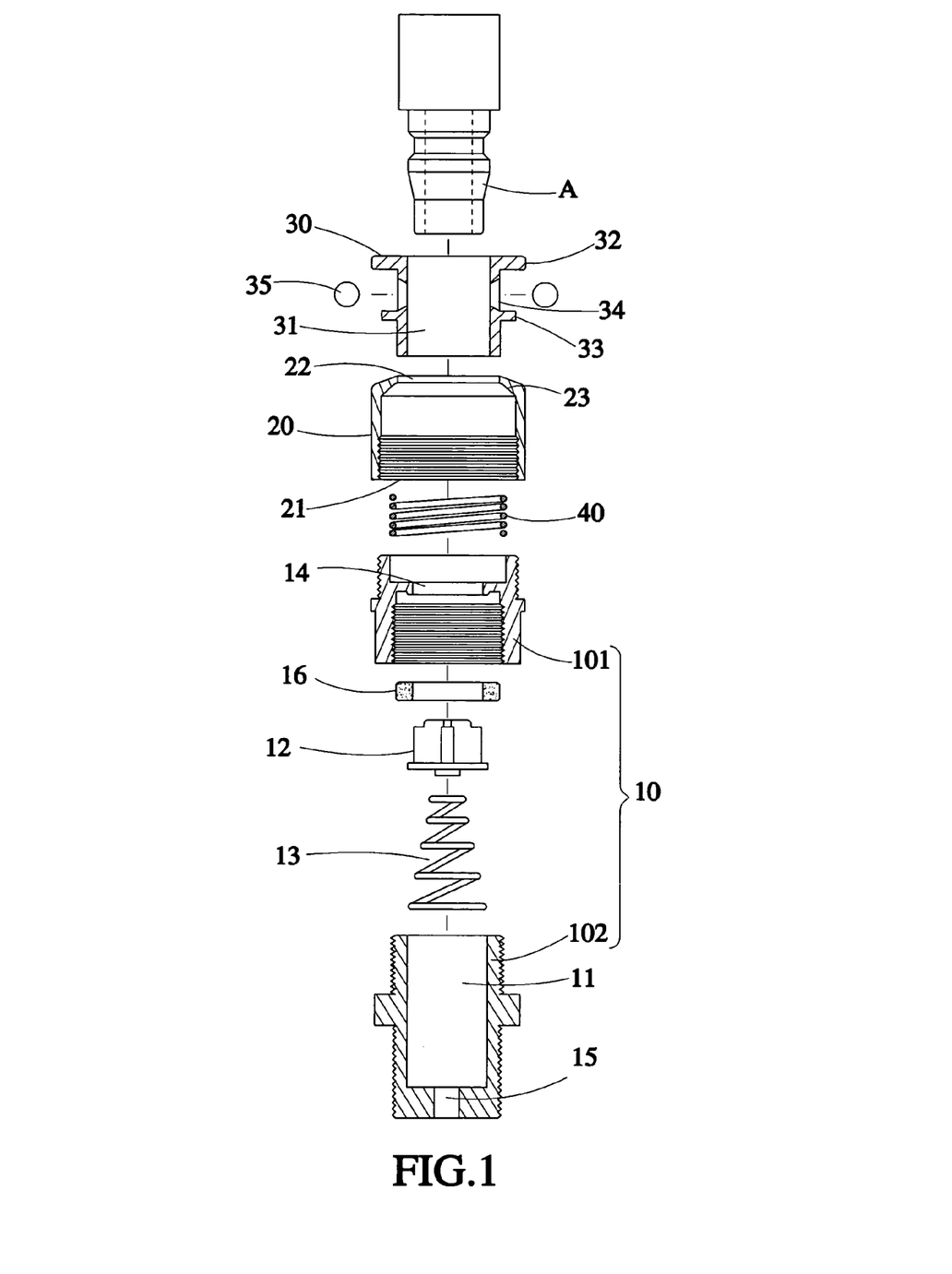
FIG. 1 is an exploded view of a preferred embodiment of the present invention.

As shown in FIG. 1, a quick connector of the preferred embodiment of the present invention includes:

A main member 10, which is connected to an end of a high-pressure hose, has a chamber 11 therein and two bores 14, 15 at opposite sides communicated with the chamber 11. A check valve 12 and an elastic device 13 are received in the chamber 11. The elastic device 13 has its opposite ends against the check valve and a wall of the chamber 11 to urge the check valve 12 sealing the bore 14 initially. In the present invention, the main member 10 consists of a first piece 101 and a second piece 102, each of which has the bores 14, 15 respectively and half parts of the chamber 11. An elastic pad 16 is received in the chamber 11.

A housing 20, which is a tubular member with openings at opposite ends, has a big end 21 and a small end 22, wherein an interior diameter of the big end is greater than that of the small end 22. The housing 20 further has a sloping section 23 on an interior side adjacent to the small end 22, such that the interior diameter of the housing 20 is gradually narrowed from the big end 21 to the small end 22. The housing 20 connects the big end 21 to the bore 14 of the main member 10 to communicate the chamber 11.

A sliding member 30, which is a tubular member too, has an elongated bore 31 through the sliding member 30, a first ring portion 32 and a second ring portion 33 on an exterior side. The sliding member 30 further has a plurality of apertures 34 between the first ring portion 32 and the second ring portion 33. Diameters of the apertures 34 are gradually narrowed from distal ends to proximal ends thereof. Balls 35 are received in the apertures 34. The sliding member 30 is inserted into the housing 20 via the small end 22 with the first ring portion 32 out of the housing 20 still, the second ring portion 33 in the housing 20, the sloping section 23 between the first ring portion 32 and the second ring portion 33, and the balls between the sloping section 23 and the second ring portion 33. In the present invention, the sliding member 30 has two apertures 34 and two balls 35 received in the apertures 34. The number of apertures 34 is changeable according to designation.

An elastic member 40 is fitted to the sliding member 30 and in the housing 20 with opposite ends against the second ring portion 33 and the main member 10 to urge the sliding member 30 distal to the main member 10 initially.

Figure 2:
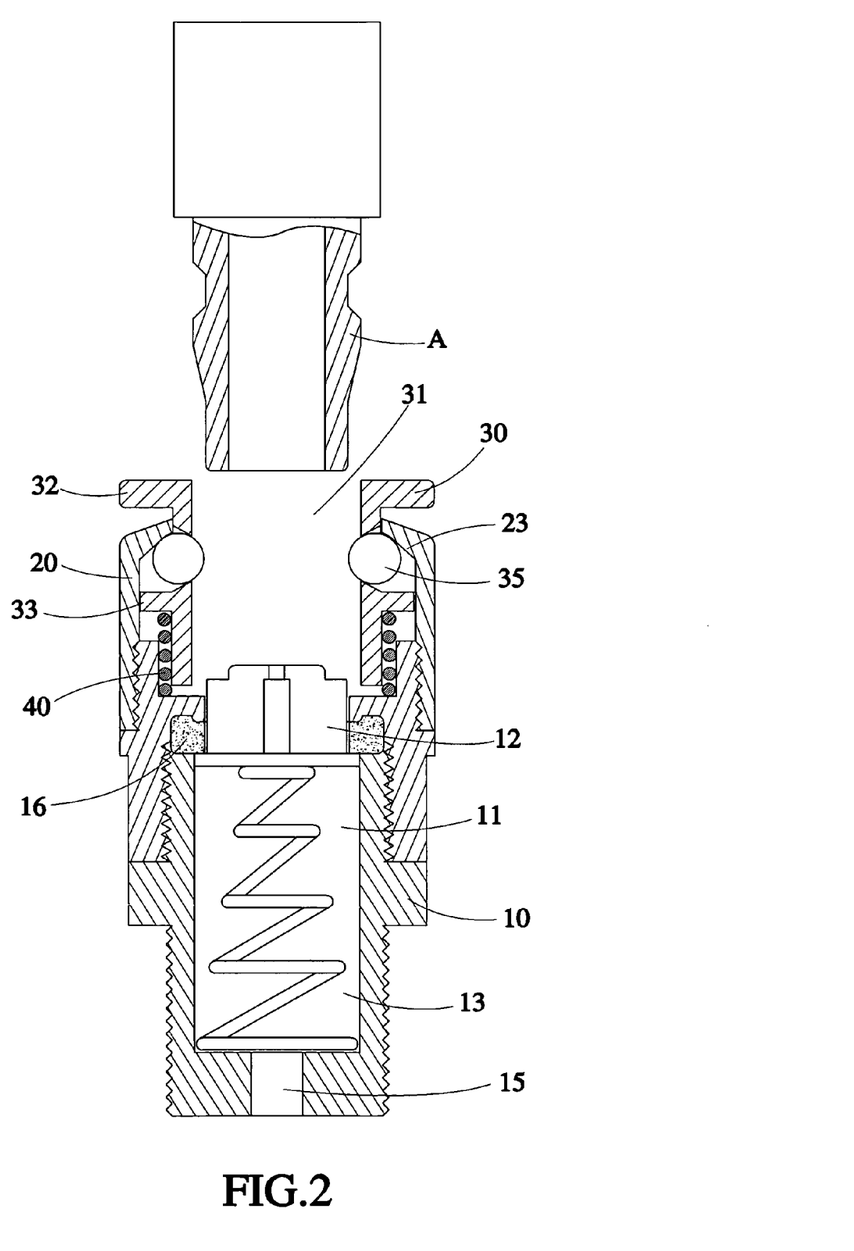
FIG. 2 to FIG. 9 are sectional views of the preferred embodiment of the present invention, showing the quick connector in operation.
Figure 3:
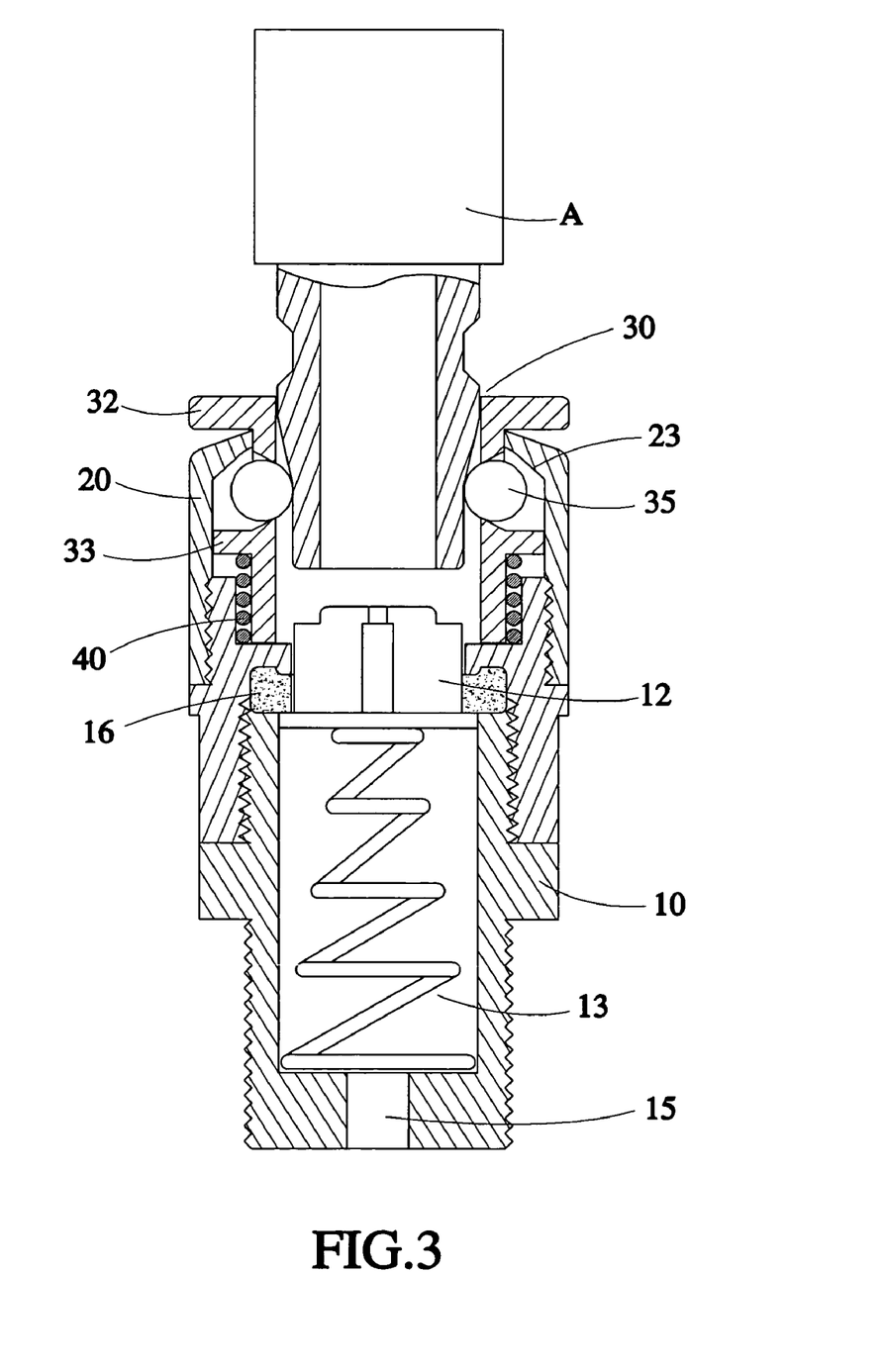
Figure 4:
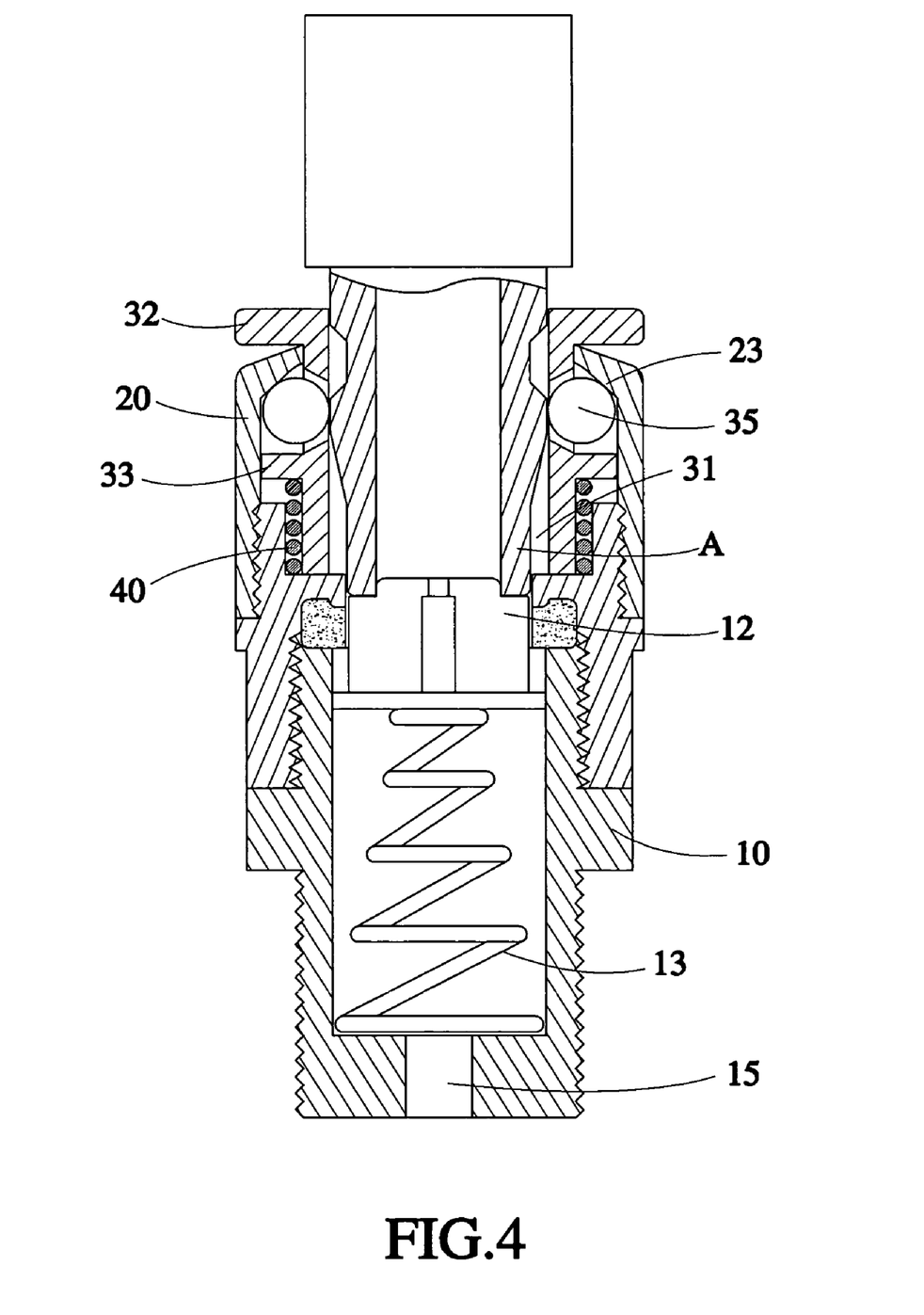
Figure 5:
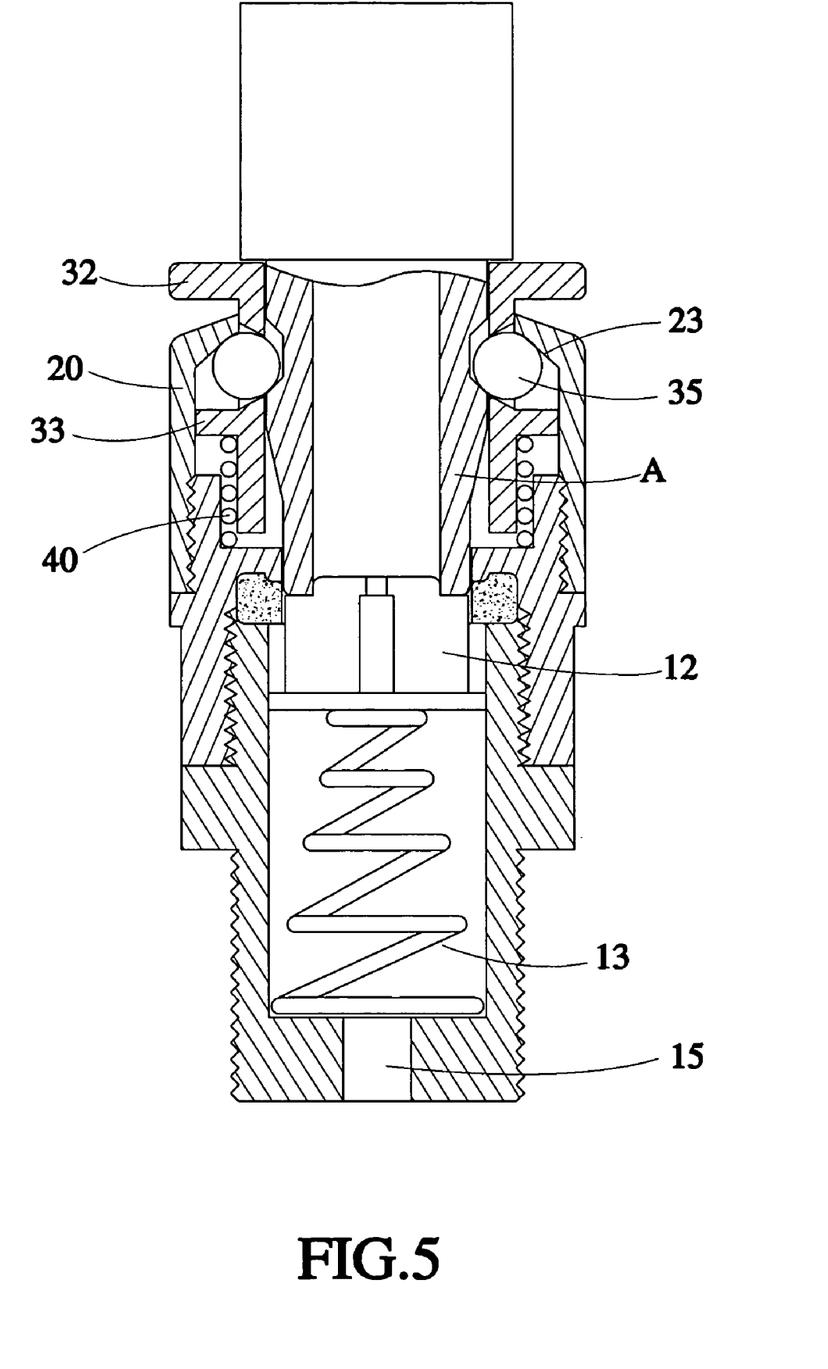
Figure 6:
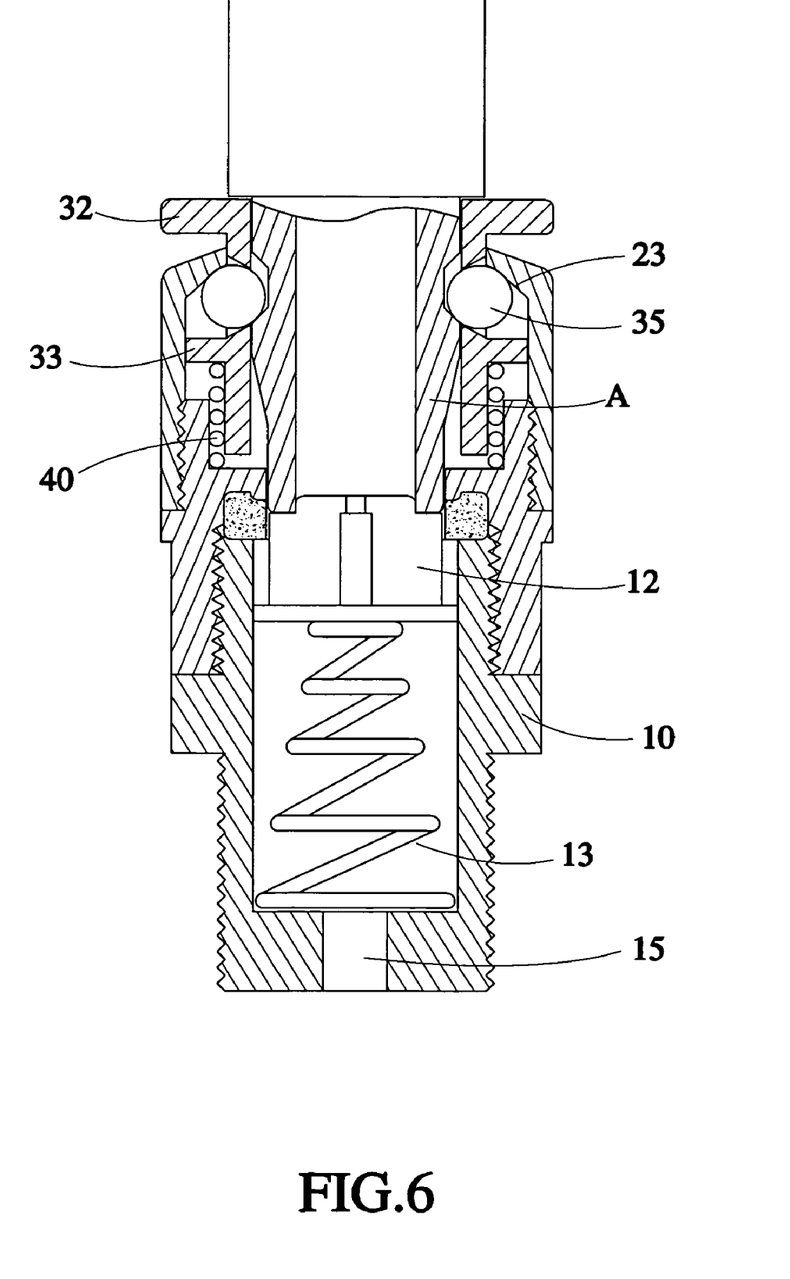
Figure 7:
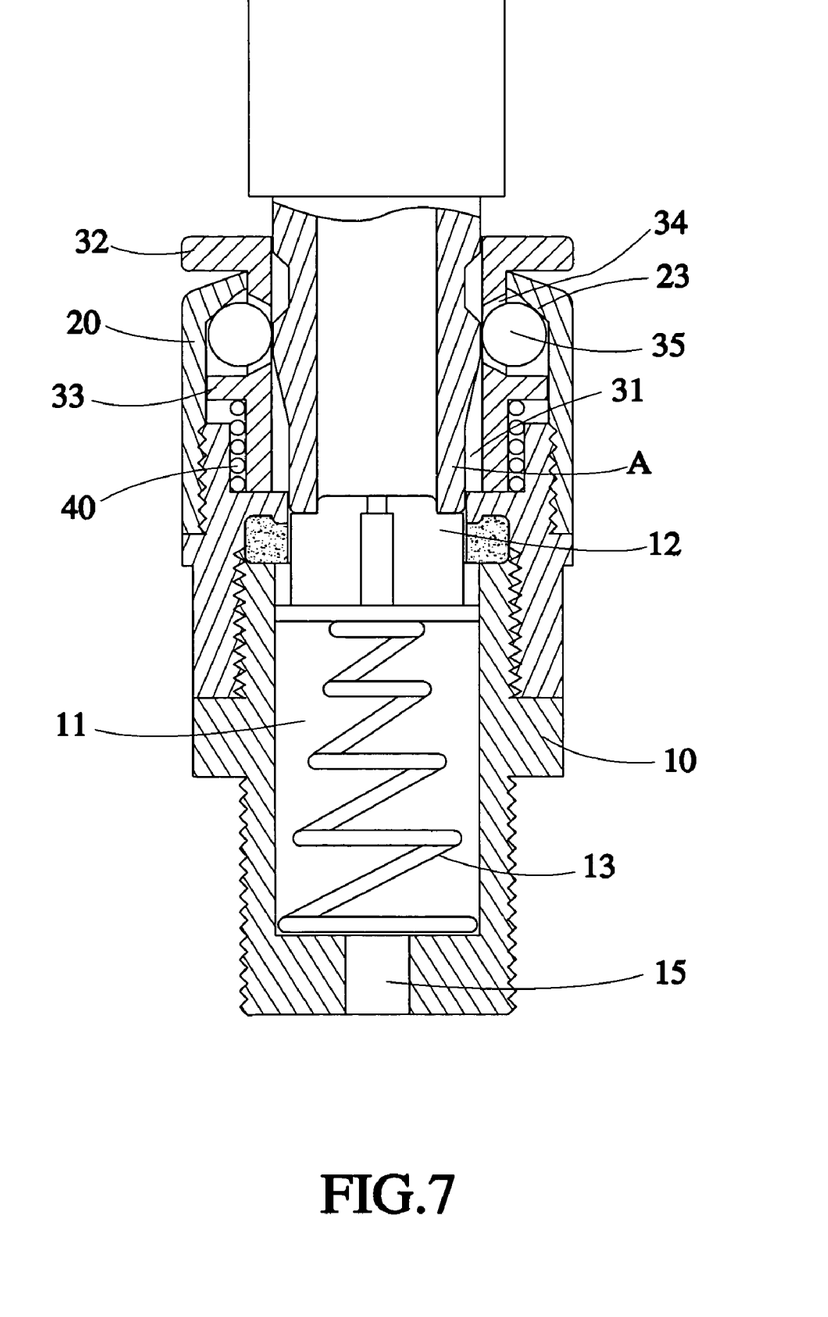
Figure 8:
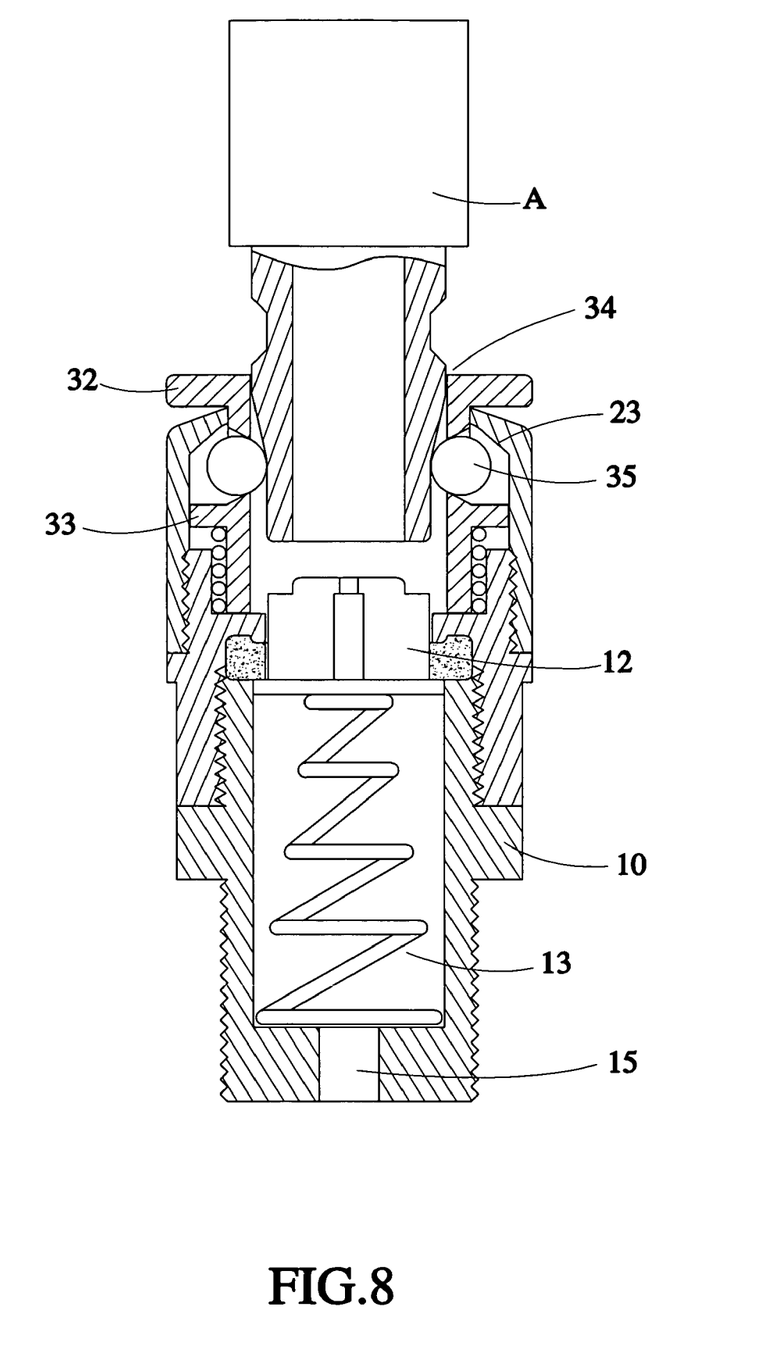
Figure 9:
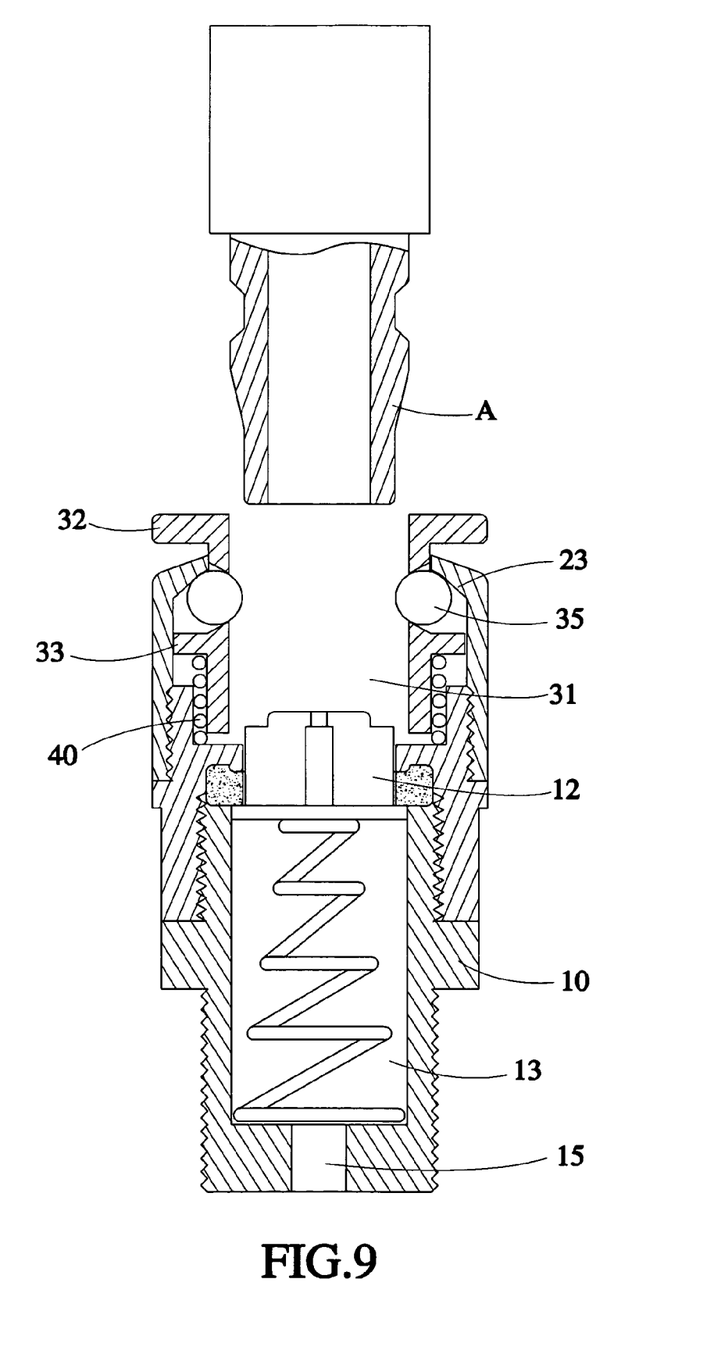

In a normal condition of the quick connector of the present invention, as shown in FIG. 2, the check valve 12 seal the bore 14 of the main member 10, the sliding member 30 moves outwardly from the housing 20 because of the elastic member 14, and the balls 35 have parts thereof out of the apertures 34 of the sliding member 30 because of the action of the second ring portion 33 and the sloping section 23.

In operation, as shown in FIG. 2 to FIG. 5, a connector of a tube A is inserted into the elongated bore 31 of the sliding member 30 to press the balls 35 back into the apertures 34, and the balls 35 press the sloping section 23 to move the sliding member 30 toward the main member 10 and compress the elastic member 40. As the movement of the sliding member 30, a space between the second ring portion 33 and the sloping section 23 is increased to get back the balls 35. As a result, the connector of the hose A may be inserted into the elongated bore 31 of the sliding member 30 and move the check valve 12 leaving the bore 14. The sliding member 30 is moved by the elastic member 40 to leave the main member 10 again and the second ring portion 33 presses the balls 35 against the sloping section 23 again to have a part of the ball extrude out of the apertures 34 by the action of the second ring portion 33 and the sloping section 23 to secure the connector of the hose 34.

To disassemble the hose A, as shown in FIG. 6 to FIG. 9, user only has to press the sling member 30 downward to move the sliding member 30 toward the main member 10 and compress the elastic member 40. As a result, the balls 35 are back in the apertures 34 and leaving the connector of the hose A so that the hose A is on longer secured by the balls 35 and is urged by the elastic device 13 under the check valve 12 to pump off the sliding member 30. And then, the sliding member 30 is released to return the sliding member 30 back to its initial position by the elastic member 40 and return the balls 35 with parts extruded out of the apertures 34.

The quick connector of the present invention provides user an easier way to assemble and disassemble the hose. There is no extra step but insert the hose directly into the quick connector of the present invention. To disassemble the hose, user only has to press the first ring portion and the hose will be released automatically.

What is claimed is:

1. A quick connector, comprising:

a main member, which connects a high-pressure hose thereto, having a chamber therein, two bores communicated with the chamber, a check valve and an elastic device, wherein the check valve and the elastic device are received in the chamber, and the elastic device has opposite ends against the check and an interior wall of the chamber of the main member to urge the check valve seal the bore;

a housing, which is a tubular member with openings at opposite ends, having a big end and a small end, which an interior diameter is smaller than that of the big end, and a sloping section on an interior side of the housing adjacent to the small end to have an interior diameter of the housing gradually narrowed from the big end to the small end, wherein the big end of the housing is connected to the bore of the main member to be communicated with the chamber of the main member;

a sliding member, which is a tubular member, having an elongated bore through the sliding member, a first ring portion and a second ring portion on an exterior side of the sliding member, a plurality of apertures between the first ring portion and the second ring portion, and balls received in the apertures, wherein the sliding member is inserted into the housing via the small end with the first ring portion out of the housing, the second ring portion in the housing and the sloping section of the housing between the first ring portion and the second ring portion; and an elastic member, which is fitted to the sliding member and received in the housing, having opposite ends against the sliding member and the main member to urge the sliding member distal to the main member initially.

2. The quick connector as claimed in claim 1, wherein each of the apertures has an interior diameter gradually narrowed from an exterior end to an interior end.

3. The quick connector as claimed in claim 1, wherein the main member has two pieces combined, each of which has the bores respectively and parts of the chamber.

4. The quick connector as claimed in claim 1, wherein the elastic member has the opposite ends against the second ring portion of the sliding member and the main member respectively.

5. The quick connector as claimed in claim 1, wherein sliding member has two of the apertures.

6. The quick connector as claimed in claim 1, wherein the balls is received between the sloping section and the second ring portion.

* * * * *